United States Patent [19]

Reed

[11] 4,412,062

[45] Oct. 25, 1983

[54] POLYMER STABILIZATION

[75] Inventor: Jerry O. Reed, Bartlesville, Okla.

[73] Assignee: Phillips Petroleum Company, Bartlesville, Okla.

[21] Appl. No.: 392,040

[22] Filed: Jun. 25, 1982

[51] Int. Cl.³ .............................................. C08G 75/14
[52] U.S. Cl. ................................ 528/388; 264/331.11
[58] Field of Search ..................... 528/388; 264/331.11

[56] References Cited

U.S. PATENT DOCUMENTS 3,047,608 7/1962 Friedman et al. .................. 260/461
3,658,753 4/1972 Reed et al. ..................... 260/45.7 P
3,884,873 5/1975 Short .............................. 260/45.85
4,185,004 1/1980 Mathis ............................ 260/45.8 R Primary Examiner—Melvyn I. Marquis

[57] ABSTRACT

The addition of cure retarders chosen from among the following classes of compounds: tetraoxaphosphaspiroundecane, 4-hydroxybenzyl isocyanurate, N-hydrocarbylthiophthalimide, and trihydrocarbyl trithiophosphite improves the melt stability and reduces the melt viscosity of arylene sulfide resins, such as poly(phenylene sulfide) resin.

25 Claims, No Drawings

4,412,062

POLYMER STABILIZATION

FIELD OF INVENTION

This invention relates to improving the characteristics of arylene sulfide polymer compositions. In one of its aspects this invention relates to the use of melt viscosity reducing additives in poly(arylene sulfide) compositions. In another of its aspects, this invention relates to the use of cure retarders in poly(arylene sulfide) resin compositions. In another aspect, this invention relates to the use of cure retarders and heat stabilizers in poly(arylene sulfide) resin compositions to prevent cross-linking or substantial alteration of physical properties during heating. In a further aspect, this invention relates to the use of selected stabilizers to improve the heat stability and to reduce the melt viscosity of arylene sulfide polymer compositions, especially poly(phenylene sulfide) resins. In a further aspect, this invention relates to improving the heat stability of fiber grade poly(phenylene sulfide) resins by the addition of a cure retarder or stabilizer.

BACKGROUND OF THE INVENTION

In applications, such as in the production of fibers and films from arylene sulfide polymers, it is desirable that the melt flow and molecular weight of the polymer remain substantially unchanged during processing of the polymer. Various procedures have been utilized to stabilize arylene sulfide polymers against changes in physical properties during processing. It has now been discovered that arylene sulfide polymers can be treated in a manner such that the polymer properties remain substantially unchanged during heating of the polymer by incorporating into the polymer a cure retarder.

Furthermore, in applications such as molding, for example injection molding, it is often desirable that the melt viscosity of the molten polymeric composition be low to enhance the flow ability of the polymer so as to improve the efficiency in filling intricately shaped molds. It has now been discovered that the addition of certain compounds to arylene sulfide polymers will reduce the polymeric melt viscosity of the resin composition resulting in improved molding processability.

It is an object of this invention to provide a process for improving the melt stability of arylene sulfide polymers.

A further object of this invention is to provide an improved process for stabilizing the physical properties, especially melt stability and molecular weight, of arylene sulfide resins during processing.

A further object of this invention is to provide arylene sulfide polymers having improved physical properties with respect to melt stability and molecular weight, in particular.

A further object of this invention is to provide phenylene sulfide polymers exhibiting improved melt stability.

A further object of this invention is to provide phenylene sulfide polymers of improved processability, particularly in the filling of intricately shaped molds.

Other objects, aspects, and the various advantages of the invention will be apparent to those skilled in the art upon a study of the specification and the appended claims.

SUMMARY OF THE INVENTION

According to the invention, the heat stability and melt processability of arylene sulfide resins is improved by the addition of an effective amount of at least one additive selected from among the following classes of compounds—tetraoxaphosphaspiro undecane, 4-hydroxybenzyl isocyanurate, N-hydrocarbylthiophthalimide and trihydrocarbyl trithiophosphite which retards curing and cross-linking and reduces melt viscosity of the resin during heating.

In another embodiment of the invention, the heat stability and the melt processability of poly(arylene sulfide) resins, for example, poly(phenylene sulfide) resins, is improved by incorporating therein prior to heating at processing conditions an effective amount of at least one additive selected from among the following classes of compounds—tetraoxaphosphaspiro undecane, 4-hydroxybenzyl isocyanurate, N-hydrocarbylthiophthalimide and trihydrocarbyl trithiophosphite to retard curing and cross-linking and to reduce melt viscosity during heating of the polymer.

In still another embodiment of the invention, the heat stability of a fiber and film grade poly(phenylene sulfide) polymer is improved by the addition of a compound chosen from the following groups of compounds—tetraoxaphosphaspiroundecane, 4-hydroxybenzyl isocyanurate, N-hydrocarbylthiophthalimide or trihydrocarbyl trithiophosphite.

DESCRIPTION OF THE PREFERRED EMBODIMENTS

The invention is applicable for use with any normally solid, heat curable, high molecular weight arylene sulfide polymer. Arylene sulfide polymers which can be employed in the process of this invention include arylene sulfide polymers which have a melt flow of at least about 10 and generally within the range of about 20 to about 400 and higher (determined by the method of ASTM D 1238-70, modified to a temperature of 316° C. using a 5-kg weight, the value being expressed as g/10 min.). Thus, the arylene sulfide polymers can be linear, branched or lightly cross-linked. The preferred arylene sulfide polymer is a linear poly(phenylene sulfide) (PPS) having a melting or softening point of at least 150° C., preferably 230° C. to 330° C. Although the method by which the polymers of this description are produced is not critical, preferably the polymer employed in the process is prepared by use of polyhalo aromatic compounds, alkali metal sulfides, and organic amides. For example, the arylene sulfide polymers for use in this invention can be produced by the method of U.S. Pat. No. 3,354,129, which is hereby incorporated by reference. Alternatively, and presently preferred, the polymer employed can be prepared by use of a p-dihalobenzene, an alkali metal sulfide, an organic amide, and an alkali metal carboxylate as in U.S. Pat. No. 3,919,177, optionally, together with an alkali metal hydroxide such as sodium hydroxide. The disclosure of U.S. Pat. No. 3,919,177 is hereby incorporated by reference.

The tetraoxaphosphaspiro undecane compounds used as cure retarders and heat stabilizers according to the invention, can be represented by the following structure

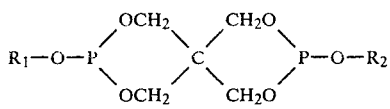

where $R_1$ and $R_2$ are selected from the group consisting of aryl, alkyl, and alkaryl.

Representative compounds of the type described above include 3,9-diphenoxy-2,4,8,10-tetraoxa-3,9-diphosphaspiro[5,5]undecane, (diphenyl pentaerythritol diphosphite); 3,9-di(decyloxy)-2,4,8,10-tetraoxa-3,9-diphosphaspiro[5,5]undecane; 3,9-di(isodecyloxy)-2,4,8,10-tetraoxa-3,9-diphosphaspiro[5,5]undecane; 3,9-di(octadecyloxy)-2,4,8,10-tetraoxa-3,9-diphosphaspiro[5,5]undecane, (distearyl pentaerythritol diphosphite); 3-phenoxy-9-isodecyloxy-2,4,8,10-tetraoxa-3,9-diphosphaspiro[5,5]undecane; 3,9-di(methoxy)-2,4,8,10-tetraoxa-3,9-diphosphaspiro[5,5]undecane; 3,9-di(dodecyloxy)-2,4,8,10-tetraoxa-3,9-diphosphaspiro[5,5]undecane; 3,9-di-p-tolyoxy-2,4,8,10-tetraoxa-3,9-diphosphaspiro[5,5]undecane; 3,9-di(2,4-di-t-butylphenoxy)-2,4,8,10-tetraoxa-3,9-diphosphaspiro[5,5]undecane; di(2,4-di-t-butylphenyl)-2,4,8,10-tetraoxa-3,9-diphosphaspiro[5,5]undecane, [di(2,4-di-t-butylphenyl)-pentaerythritol diphosphite]; and the like, and mixtures thereof.

The 4-hydroxybenzyl isocyanurates are described in U.S. Pat. No. 3,637,582, column 2,3. The symmetrical tris(3,5-di-t-alkyl-4-hydroxybenzyl)isocyanurates are a preferred class of compounds which can be represented by the following structure

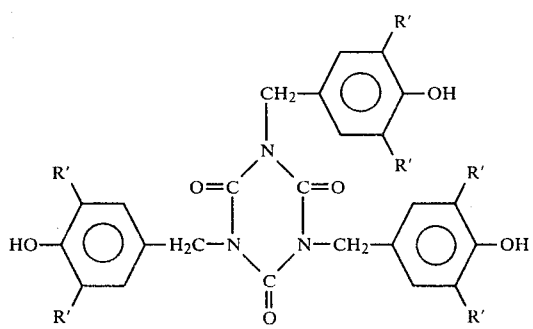

where R' is an alkyl group containing from 4 to 8 carbon atoms.

Specific examples of these compounds include tris(3,5-di-t-butyl-4-hydroxybenzyl)isocyanurate (presently preferred); tris(3-t-butyl-5-t-amyl-4-hydroxybenyl)isocyanurate; tris(3,5-di-t-amyl-4-hydroxybenzyl)isocyanurate and tris(3,5-di-t-octyl-4-hydroxybenzyl)isocyanurate.

The substituted phthalimides, particularly the N-hydrocarbylthiophthalimides useful in this invention can be represented by the following structure

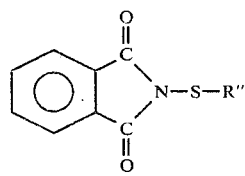

where R" is an alkyl, aryl or cycloalkyl group containing from 1 to about 8 carbon atoms.

Specific examples of these compounds include N-(methylthio)phthalimide, N-(n-hexylthio)phthalimide, N-(n-octylthio)phthalimide, N-(phenylthio)phthalimide and N-(cyclohexylthio)phthalimide presently preferred.

The trihydrocarbyl thiophosphites can be represented by the following structure

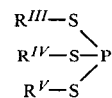

where $R^{III}$, $R^{IV}$, and $R^V$ are the same or different alkyl, aryl or cycloalkyl groups containing from 1–20 carbon atoms and combinations such as aralkyl as disclosed in U.S. Pat. No. 4,185,004 column 2.

Specific examples of these compounds include trimethyl trithiophosphite, tricyclohexyl trithiophosphite, trieicosyl trithiophosphite, triphenyl trithiophosphite, phenyl distearyl trithiophosphite, diphenyl lauryl trithiophosphite and trilauryl trithiophosphite which is presently preferred.

The amount of additive incorporated into the arylene sulfide resin will be a finite, effective amount sufficient to improve the heat stability or to reduce the melt viscosity of the polymer. In general, the additives of this invention are employed in an amount within the range of about 0.2 to about 5 preferably about 0.5 to 2 weight percent based on the weight of the arylene sulfide polymer.

In addition to the additives of this invention, the compositions can contain other ingredients conventionally employed in arylene sulfide polymer compositions. For instance, fillers such as titanium dioxide, calcium carbonate, aluminum oxide, aluminum silicate, pigments, resins and/or plasticizers, ferric oxide, silicon dioxide, asbestos fibers, glass fibers, poly(tetrafluoroethylene), and the like can be present.

The additive can be incorporated into the arylene sulfide polymer at any stage of processing, preferably prior to being subjected to elevated temperature, or at such times as it is desired to retain melt stability or to reduce melt viscosity. In one practical application of the invention, the additives are incorporated into the arylene sulfide resin, such as a poly(phenylene sulfide) resin, prior to melt spinning to form fibers or other formed articles so that gel formation is reduced during melt spinning and problems with filter and spinneret plugging is reduced or obviated.

In the process of this invention incorporating the additive into the resin can be conducted batch-wise or continuously.

The following examples are intended to illustrate the compositions and process of the invention.

EXAMPLE I

Sample Preparation and Test Method

A series of samples was prepared by mixing individual portions of a linear poly(phenylene sulfide), abbreviated PPS, with a specified additive, when employed. The PPS was produced in the manner described in U.S. Pat. No. 3,919,177. The recovered polymer was in the form of a powder (fluff), having a melt flow of 324 g/10 minutes as determined in accordance with the previously cited ASTM procedure.

Generally, about 10 g of the PPS powder was admixed by stirring with about 0.1 g (weighed) of the additive contained in about 40–50 cc of a suitable solvent or solvent mixture. The solvent was removed over a suitable period of time at ambient conditions, e.g., overnight or longer, if needed, in a laboratory fume hood.

Discs measuring 1×0.25 inches (2.54×0.64 cm) were pressed from about 2.5 g of each mixture at room temperature (about 23° C.) by employing a mold and a laboratory press using a platen pressure of about 10,000 psig (68.9 MPa). Each disc was melted and converted into a test button by compression molding at 325° C. The molding cycle typically comprised 2½ minutes at a platen pressure of about 5,000–10,000 psig (34.5–68.9 MPa) and 2½ minutes at about 30,000 psig (207 MPa). While maintaining pressure, heating was discontinued and cooling started by circulating water through the platens. When the mold temperature reached about 121° C., the pressure was released and the test button removed. The finished buttons removed about 1×0.1875 inches (2.54×0.48 cm).

Each button was evaluated for change in molecular weight in a test employing a Rheometric Dynamic Spectrometer (RDS), available from Rheometrics, Inc. The test, which determines storage modulus as a function of time at a constant shear of 10 radians per second is useful in evaluating the thermal stability and melt viscosity of the PPS sample.

The apparatus comprises two 1 inch diameter stainless steel plates, the bottom plate connected to a sensing device while the top plate can be oscillated horizontally. The test button is placed between the plates which have been preheated to 300° C. As the sample starts to melt it is squeezed to a thickness of 2 mm. Excess material is removed and the sample is allowed to thermally equilibrate for 3 minutes. The top plate is then oscillated at 10 radians per second with 10 percent strain. Readings are recorded every minute for 20 minutes as dynes per square centimeter. The absolute value at any given time is a measure of the melt viscosity of the sample at that time. The percent difference between the readings at any two elapsed times is interpreted as indicating the thermal stability of the sample. A percent increase, for example, indicates crosslinking may be occurring, the larger the value the greater the degree of crosslinking, since the storage modulus is directly proportional to polymer viscosity.

EXAMPLE II

Sample Composition and Test Results with Hot Molded Buttons

The test buttons were prepared from base polymer containing no additive (control) and base polymer admixed with about 1 weight percent of the specified additive. The additives and solvents employed and results obtained are presented in Table I.

TABLE I

Hot Molded Buttons
Influence of Selected Additives on Storage Modulus

| Run No. | Additive | Solvent Type | cc | RDS Storage Modulus Dynes/cm$^2$ 2 min | 6 min | 20 min | Percent Increase 2-6 min | 6-20 min |
|---|---|---|---|---|---|---|---|---|
| 1 | none (control) | — | — | 1800 | 2400 | 5400 | 33 | 125 |
| 2 | DSPDP | n-hexane | 10 | | | | | |
| 3 | DBPPDP | toluene | 30 | 1000 | 1050 | 4000 | 5.0 | 281 |
| 4 | DBPPDP | toluene | 40 | 1170 | 1410 | 4100 | 2.0 | 191 |
| 4 | TLTTP | n-hexane | 40 | 660 | 680 | 1900 | 3.0 | 179 |
| 5 | TBHBI | acetone | 40 | 1100 | 1300 | 3400 | 19 | 162 |
| 6 | NCYPH | acetone | 40 | 720 | 860 | 3800 | 19 | 342 |

DSPDP is distearyl pentaerythritol diphosphite.
DBPPDP is di(2,4-di-t-butylphenyl) pentaerythritol diphosphite.
TLTTP is trilauryl trithiophosphite.
TBHBI is tris(3,5-di-t-butyl-4-hydroxybenzyl) isocyanurate.
NCYPH is N—(cyclohexylthio)phthalimide.

The storage modulus values shown in control run 1, ranging from about 1800 dynes/cm$^2$ after 2 minutes to about 5400 dynes/cm$^2$ after 20 minutes, are typical for the PPS sample employed in the test. Each composition containing the specified additive is shown to have a lower storage modulus than the control across the entire time span. This indicates the viscosity of each sample is less than that of the control since storage modulus is directly related to polymer viscosity. Lower viscosity also suggests that better processability, i.e., improved flow, can be achieved with the invention compositions, a definite advantage in molding. The improved melt stability is evident in the relative percent increase in storage modulus between 2 minutes and 6 minutes for the samples containing the additive compared to the control. However, from 6 minutes to 20 minutes the relative percent increase in storage modulus favors the control although on an absolute value basis the control is substantially poorer than the remaining compositions since its absolute viscosity values throughout the testing period are substantially higher.

EXAMPLE III

A series of samples was prepared, compression molded into discs at room temperature (cold molded) and the storage modulus values determined all as described before. In this example, buttons were not hot molded from the discs as in Example II, thus the samples did not receive that heat treating step prior to being tested.

The additives and solvents employed and the results obtained are given in Table II. The additive abbreviations are the same as in Table I and have the same connotation.

TABLE II

Cold Molded Discs
Influence of Selected Additives on Storage Modulus

| Run No. | Additive Type | Wt. % | Solvent Type | cc | RDS Storage Modulus Dynes/cm$^2$ 2 min | 6 min | 20 min | Percent Change 2-6 min | 6-20 min |
|---|---|---|---|---|---|---|---|---|---|
| 7 | none (control) | | | | 3240 | 3680 | 7000 | 14 | 90 |
| 8 | none (repeat) | | | | 3430 | 3680 | 6610 | 7.3 | 80 |
| 9 | TBHBI | 0.5 | acetone | 40 | 2950 | 2880 | 4170 | −2.4 | 45 |
| 10 | TBHBI | 2.0 | acetone | 40 | 2730 | 2330 | 2700 | −14 | 16 |
| 11 | TBHBI | 0.5 | acetone | 20 | 2220 | 2120 | 2470 | −4.5 | 17 |
| | DOPI | 1.5 | n-hex- | 20 | | | | | |

TABLE II-continued

Cold Molded Discs
Influence of Selected Additives on Storage Modulus

| Run No. | Additive Type | Wt. % | Solvent Type | cc | RDS Storage Modulus Dynes/cm² 2 min | 6 min | 20 min | Percent Change 2-6 min | 6-20 min |
|---|---|---|---|---|---|---|---|---|---|
| 12 | TBHBI | 0.5 | acetone | 20 | 1870 | 1810 | 2120 | −3.2 | 17 |
|  | TLTTP | 1.5 | n-hexane | 20 |  |  |  |  |  |
| 13* | TBHBI | 1 | acetone | 40 | 2930 | 2540 | 3210 | −13 | 26 |

*Cold molded disc of Sample 5 of Example II

As noted before, each composition containing the specified additive or additives is demonstrated to have a lower storage modulus value than the controls containing no additive across the entire time span tested indicating that the molding processability of the invention runs 9–13 are better than the control. The percent changes in storage modulus for invention runs 9–13 are also seen to be lower than for the control runs 7 and 8 indicating that the invention additives are cure retarders for poly(phenylene sulfide).

The negative percent changes indicate that the viscosity of those compositions actually decreases during the 2–6 minute portion of the test.

Invention runs 9, 10, and 13 show that TBHBI is effective at 0.5 to 2 weight percent and suggest that lesser and greater amounts will be expected to be effective also. Invention runs 11,12 show that combinations of the specified additives are operable in the invention.

We claim:

1. A resin composition exhibiting improved melt stability and reduced melt viscosity when subjected to heat comprising a poly(arylene sulfide) resin containing an effective amount sufficient to retard resin curing or cross-linking and to reduce polymer melt viscosity of at least one compound chosen from among the classes of compounds consisting essentially of tetraoxaphosphaspiroundecane, 4-hydroxybenzyl isocyanurate, N-hydrocarbylthiophthalimide, and trihydrocarbyl trithiophosphite.

2. An article of manufacture formed from the composition of claim 1.

3. A fiber formed from the composition of claim 1.

4. A film formed from the composition of claim 1.

5. A composition according to claim 1 wherein the amount of additive present ranges from about 0.2 to about 5 weight percent based on the weight of the arylene sulfide polymer.

6. A composition according to claim 5 wherein said arylene sulfide polymer is a poly(phenylene sulfide) having a melt flow of about 20 to about 400.

7. A composition according to claim 1 wherein said compound is a tetraoxaphosphaspiroundecane having the formula

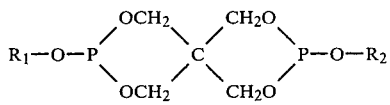

where $R_1$ and $R_2$ are selected from the group consisting of aryl, alkyl, and alkaryl.

8. A composition according to claim 7 wherein said arylene sulfide polymer is poly(phenylene sulfide) and said tetraoxaphosphaspiroundecane is chosen from among 3,9-diphenoxy-2,4,8,10-tetraoxa-3,9-diphosphaspiro[5,5]undecane and di(2,4-di-t-butylphenyl)-2,4,8,10-tetraoxa-3,9-diphosphaspiro[5,5]undecane.

9. A composition according to claim 1 wherein said compound is a 4-hydroxybenzyl isocyanurate.

10. A composition according to claim 9 wherein said 4-hydroxybenzyl isocyanurate is tris(3,5-di-t-butyl-4-hydroxybenzyl)isocyanurate.

11. A composition according to claim 1 wherein said compound is an N-hydrocarbylthiophthalimide.

12. A composition according to claim 10 wherein said N-hydrocarbylthiophthalimide is N-(cyclohexylthio)phthalimide.

13. A composition according to claim 1 wherein said compound is a trihydrocarbyl trithiophosphite.

14. A composition according to claim 13 wherein said trihydrocarbyl trithiophosphite is trilauryl trithiophosphite.

15. A method for improving the melt stability and reducing the melt viscosity of poly(arylene sulfide) resins which comprises incorporating therein an effective amount of a compound chosen from the classes of compounds consisting essentially of tetraoxaphosphaspiroundecane, 4-hydroxybenzyl isocyanurate, N-hydrocarbylthiophthalimide, and trihydrocarbyl trithiophosphite which amount is sufficient to retard curing or cross-linking and to reduce the melt viscosity of said resin during heating.

16. A method according to claim 15 wherein the amount of said compound ranges from about 0.2 to about 5 weight percent based on the weight of the arylene sulfide polymer.

17. A process according to claim 15 wherein said arylene sulfide polymer is poly(phenylene sulfide).

18. A method according to claim 15 wherein said compound is tetraoxaphosphaspiroundecane having the formula

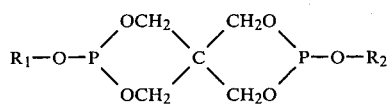

where $R_1$ and $R_2$ are selected from the group consisting of aryl, alkyl, and alkaryl.

19. A method of claim 18 in which said tetraoxaphosphaspiroundecane is chosen from the group consisting essentially of 3,9-diphenoxy-2,4,8,10-tetraoxa-3,9-diphosphaspiro[5,5]undecane and di(2,4-di-t-butylphenyl)-2,4,8,10-tetraoxa-3,9-diphosphaspiro[5,5]undecane.

20. A method according to claim 15 wherein said compound is a 4-hydroxybenzyl isocyanurate.

21. A method according to claim 20 wherein said 4-hydroxybenzyl isocyanurate is tris(3,5-di-t-butyl-4-hydroxybenzyl)isocyanurate.

22. A method according to claim 15 wherein said compound is an N-hydrocarbylthiophthalimide.

23. A method according to claim 22 wherein said N-hydrocarbylthiophthalimide is N-(cyclohexylthio)phthalimide.

24. A method according to claim 15 wherein said compound is a trihydrocarbyl trithiophosphite.

25. A method according to claim 24 wherein said trihydrocarbyl trithiophosphite is trilauryl trithiophosphite.

* * * * *

UNITED STATES PATENT AND TRADEMARK OFFICE
CERTIFICATE OF CORRECTION

PATENT NO. : 4,412,062

DATED : October 25, 1983

INVENTOR(S) : Jerry O. Reed

It is certified that error appears in the above-identified patent and that said Letters Patent is hereby corrected as shown below:

[75] "Inventor: Jerry O. Reed, Bartlesville, Okla." should be ---Ronald D. Mathis, Jerry O. Reed, both of Bartlesville, Okla.---

Signed and Sealed this

Twenty-fourth Day of January 1984

[SEAL]

Attest:

GERALD J. MOSSINGHOFF

Attesting Officer     Commissioner of Patents and Trademarks